United States Patent
Chang

(10) Patent No.: US 9,202,036 B2
(45) Date of Patent: Dec. 1, 2015

(54) NOTEBOOK COMPUTER AUTHORIZED WITH TOUCH TRACK

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1 day.

(21) Appl. No.: 14/135,469

(22) Filed: Dec. 19, 2013

(65) Prior Publication Data

US 2015/0007305 A1    Jan. 1, 2015

(30) Foreign Application Priority Data

Jun. 28, 2013 (CN) .......................... 2013 1 0263757

(51) Int. Cl.

| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/35 | (2013.01) |

(52) U.S. Cl.
CPC ........................................ G06F 21/35 (2013.01)

(58) Field of Classification Search
CPC ............................. G06F 3/0304; G06F 21/36
USPC ............................................................ 726/18
See application file for complete search history.

(56) References Cited

U.S. PATENT DOCUMENTS

2012/0110662 A1\*  5/2012  Brosnan ........................... 726/19
2014/0061604 A1\*  3/2014  Seo et al. ........................ 257/40

OTHER PUBLICATIONS

Alanson P.; A Capacitive Touch Interface for Passive RFID Tags; Year: 2009; IEEE; p. 103-108.\*

\* cited by examiner

*Primary Examiner* — Monjour Rahim
(74) *Attorney, Agent, or Firm* — Novak Druce Connolly Bove + Quigg LLP

(57) ABSTRACT

A notebook computer includes a main body and a display device. The main body includes a first touch layer sensing a touch track of a user, a memory pre-storing an authorizing track, and a processor connected between the first touch layer and the memory. The processor compares the touch track with the authorizing track to determine if the user is authorized. The display device is jointed to be pivoted to the main body, wherein the display device is turn on when the user is authorized.

7 Claims, 3 Drawing Sheets

NOTEBOOK COMPUTER AUTHORIZED WITH TOUCH TRACK

BACKGROUND

1. Technical Field

The present disclosure relates to notebook computers and, particularly to a notebook computer authorized with a touch track.

2. Description of Related Art

For security purposes, notebook computers require a password to be entered for accessing information. However, with the development of information technology, the traditional password is not sufficient for ensuring the security of information.

Therefore, it is desirable to provide a notebook computer that can overcome the limitations described.

DETAILED DESCRIPTION

Embodiments of the disclosure will be described with reference to the drawings.

Figure 1:
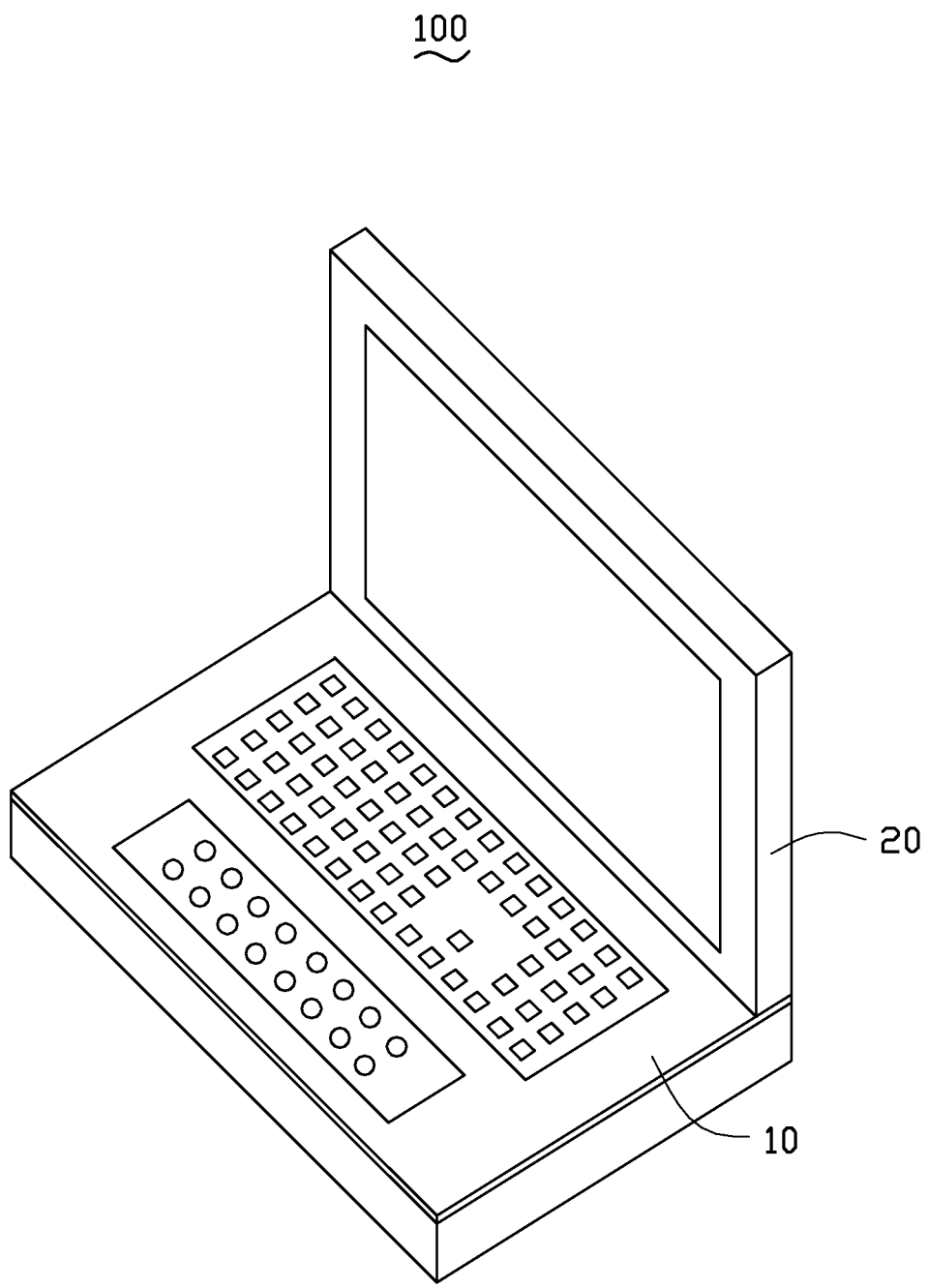
FIG. 1 is a schematic view of a notebook computer in accordance with an exemplary embodiment.
Figure 2:
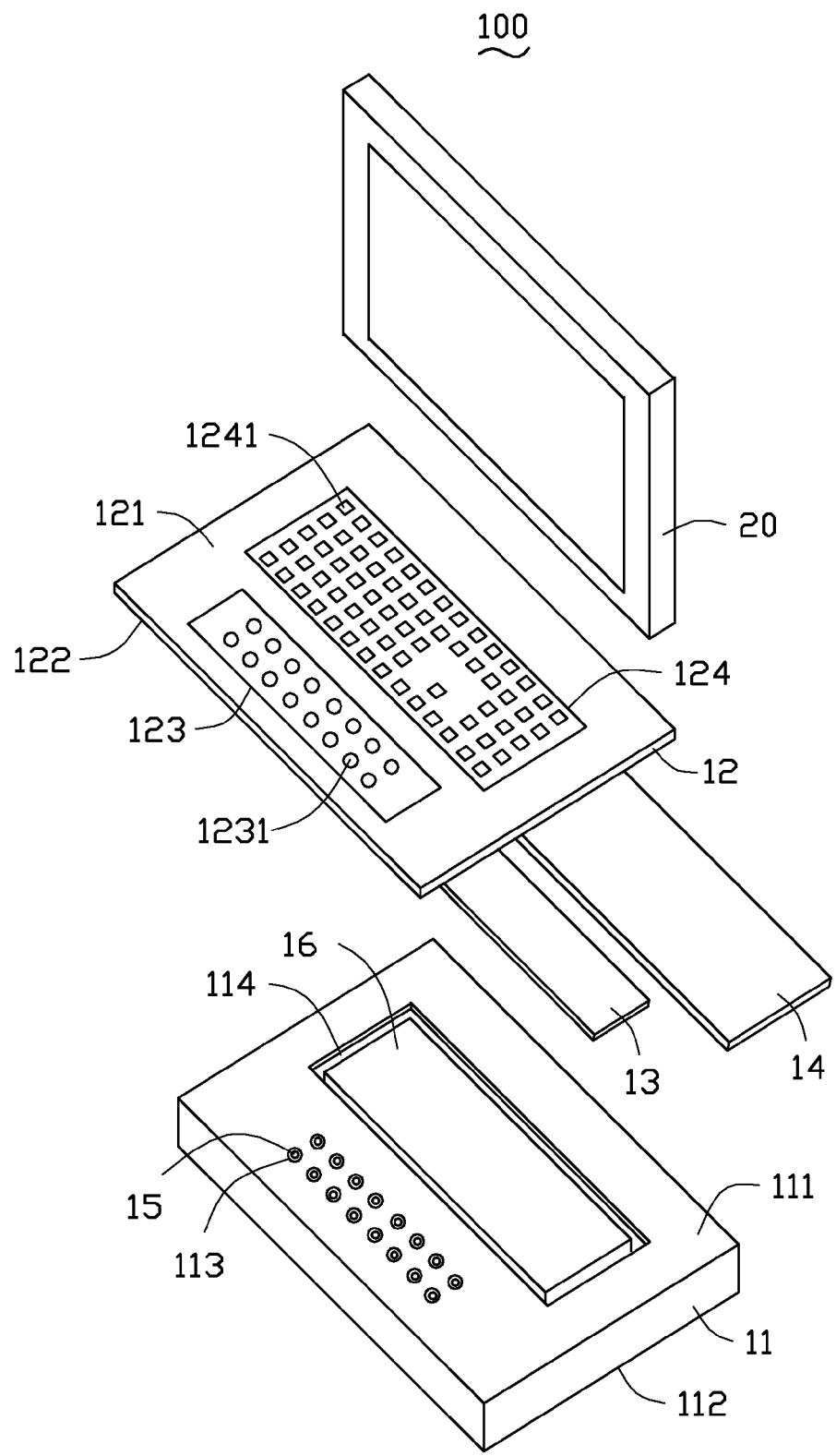
FIG. 2 is an exploded and schematic view of the notebook computer of FIG. 1.
Figure 3:
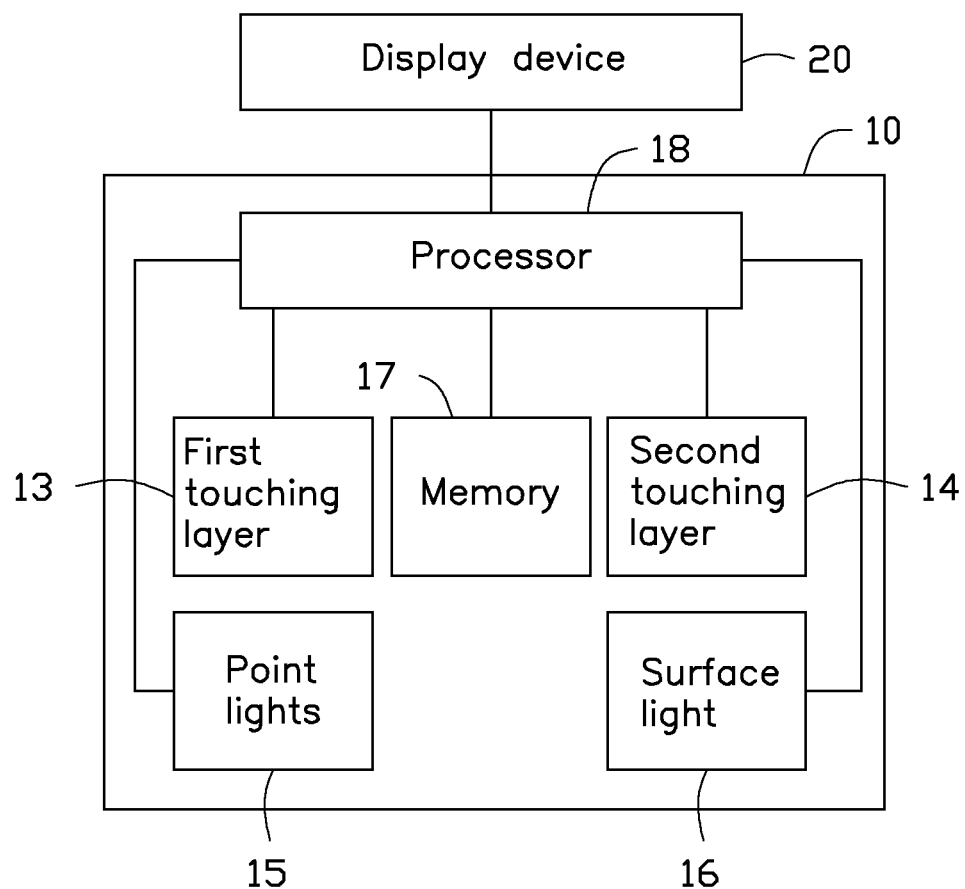
FIG. 3 is a functional block diagram of the notebook computer of FIG. 1.

FIGS. 1-3 show a notebook computer 100 according to an exemplary embodiment. The notebook computer 100 includes a main body 10 and a display device 20 pivotally jointed to the main body 10.

The main body 10 includes a casing 11, a cover glass 12, a first touch layer 13, a second touch layer 14, a number of point lights 15, a surface light 16, a memory 17, and a processor 18.

The casing 11 is a cuboid, and includes a top surface 111 and a bottom surface 112 opposite to the top surface 111. The display device 20 is jointed to be pivoted to an edge of the casing 11. The top surface 111 faces the display device 20. The casing 11 defines a number of first light holes 113 and a second light hole 114 on the top surface 111. The second light hole 114 is adjacent to the display device 20 in relative to the first light holes 113. The first light holes 113 are defined in the top surface 111 and arranged in an array, and each first light hole 113 is circular. In the embodiment, the first light holes 113 are arrayed in two rows extending along a direction parallel with the edge connected with the display device 20. The second light hole 114 is a rectangle, and is enough to receive a keyboard of a common notebook computer.

The cover glass 12 is plate shaped, and includes an upper surface 121 and a lower surface 122 opposite to the upper surface 121. The cover glass 12 includes a track input area 123 and a keyboard input area 124 separating from the track input area 123. A number of position icons 1231 are defined in the track input area 123, and a number of button icons 1241 are defined in the keyboard input area 124. In the embodiment, the position icons 1231 are arrayed in two rows, and the button icons 1241 consist of a typical keyboard. The cover glass 12 covers on the top surface 111 of the casing 11. The keyboard input area 124 is adjacent to the display device 20 in relative to the track input area 123. The position icons 1231 of the track input area 123 are corresponding to the first light holes 113. The keyboard input area 124 is corresponding to the second light hole 114.

The first touch layer 13 is attached on the lower surface 122 of the cover glass 12, and faces the track input area 123. In the embodiment, the first touch layer 13 is a capacitive touch layer. It should be understood that the first touch layer 13 can be other kinds of touch layers, such as, resistive touch layer. When a user touches the upper surface 121 of the track input area 123 of the cover glass 12, a capacitance of a point of the first touch layer 13 corresponding to that point of the upper surface 121 is changed. In addition, a frequency of an oscillator connected to the first touch layer 13 is changed. A touch position of the user can be decided by detecting a frequency variation. In the embodiment, a size of the first touch area 13 is equal to a size of the track input area 123.

The second touch layer 14 is attached on the lower surface 122 of the cover glass 12, and faces the keyboard input area 124. In the embodiment, the second touch layer 14 is a capacitive touch layer. The second touch layer 14 can be other kinds of touch layers, such as, resistive touch layer. When a user touches the upper surface 121 of the keyboard input area 124 of the cover glass 12, a capacitance of a point of the second touch layer 14 corresponding to that point of the upper surface 121 is changed. In addition, a frequency of an oscillator connected to the second touch layer 14 is changed. A touch position of the user can be decided by detecting a frequency variation. In the embodiment, a size of the second touching area 14 is equal to a size of the keyboard input area 124.

The point lights 15 are received in the casing 11, and face the first light holes 113 respectively. In the embodiment, the point lights 15 are LEDs. A blocking plate (not shown) separates two adjacent point lights 15.

The surface light 16 is received in the casing 11, and faces the second light hole 114. In the embodiment, the surface light 16 includes a LED and a diffusing plate configured for diffusing light rays emitted from the LED.

The memory 17 is a nonvolatile storage device, and an authorizing track is pre-stored in the memory 17. The authorizing track can be changed as needed.

The processor 18 is received in the casing 11, and is electrically connected to the first touch layer 13, the second touch layer 14, the point lights 15, the surface light 16, the memory 17, and the display device 20. When the first touch layer 13 senses a touch track, the processor 18 compares the touch track with the authorizing track. The processor 18 turns the point lights 15 on when the first touch layer 13 senses a touch to the position icons 1231 of the track input area 123. For example, when a current user touches a position icon 1231, the point light 15 corresponding to this position icon 1231 is turned on. When the touch track is the same as the authorizing track, the processor 18 starts the second touch layer 14 and the display device 20, the current user is authorized to enter an operation system of the notebook computer 100. The processor 18 turns the surface light 16 on when the second touch layer 14 senses a touch to the keyboard icons 1241 of the keyboard input area 124.

In assembly, firstly, the point lights 15, the surface source 16, the memory 17, and the processor 18 are assembled in the casing 11. Then, the first touch layer 13 and the second touch layer 14 are respectively attached on the lower surface 122 of the cover glass 12. The cover glass 12 is covered on the top surface 111 of the casing 11. The display device 20 is assembled on the casing 11.

In use, when the notebook computer 100 is unused by a user over a predetermined time period, the process 18 will lock the second touch layer 14 and the display device 20. Therefore, the second touch layer 14 will not detect a touch of the user, and the display device 20 keeps tuning off. If the user wants to use the notebook computer 100, the user touches the track input area 123 of the cover glass 12 to unlock the notebook computer 100.

The first touch layer 13 senses a touch track of the user, and the point lights 15 corresponding to the position icons 1231 touched by the user are turn on. The processor 18 compares the touch track sensed by the first touch layer 13 with the authorizing track stored in the memory 17. When the touch track is the same as the authorizing track, the processor 18 starts the second touch layer 14 and the display device 20, the current user is authorized to enter an operation system of the notebook computer 100. Otherwise, the notebook computer 100 remains locked.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A notebook computer, comprising:
    a main body, comprising:
        a casing having a top surface and a bottom surface opposite to the top surface;
        a plurality of point lights received in the casing and exposed at the top surface;
        a first touch layer sensing a touch track of a user;
        a cover glass defining a track input area and having an upper surface and a lower surface opposite to the upper surface, the first touch layer attached on the lower surface, a plurality of position icons defined in the track input area at the upper surface, the cover glass covering the top surface, the first touch layer sandwiched between the point lights and the track input area, the first touch layer aligned with the point lights and the position icons;
        a memory pre-storing an authorizing track; and
        a processor connected between the first touch layer and the memory, and comparing the touch track with the authorizing track to determine whether or not the user is authorized; and
    a display device pivotally coupled to an edge of the casing, wherein the display device is activated when the user is authorized, when a position icon is touched sensed by the first touch layer, the point light corresponding to the touched position icon is turned on.

2. The notebook computer of claim 1, wherein the main body further comprises a second touch layer, the cover glass comprises a keyboard input area, and the second touch layer is connected to the processor and faces the keyboard input area.

3. The notebook computer of claim 2, wherein the keyboard input area separates from the track input area, and the keyboard input area is nearer to the display device than the track input area is to the display device.

4. The notebook computer of claim 2, wherein a plurality of button icons are defined in the keyboard input area.

5. The notebook computer of claim 4, wherein the lower surface faces the casing, and the second touch layer is attached on the lower surface.

6. The notebook computer of claim 5, wherein the top surface faces the cover glass, the casing defines a plurality of first light holes facing the first touch layer and a second light hole facing the second touch layer.

7. The notebook computer of claim 6, comprising a surface light, wherein the surface light are received in the casing, the point lights face the first light holes respectively, and the surface light faces the second light hole.

* * * * *